US006931310B2

(12) United States Patent
Shimizu et al.

(10) Patent No.: US 6,931,310 B2
(45) Date of Patent: Aug. 16, 2005

(54) VEHICLE ELECTRIC MOTOR DIAGNOSING APPARATUS

(75) Inventors: Kouichi Shimizu, Sagamihara (JP); Hiroyuki Ohya, Zama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 61 days.

(21) Appl. No.: 10/641,135

(22) Filed: Aug. 15, 2003

(65) Prior Publication Data

US 2004/0055304 A1 Mar. 25, 2004

(30) Foreign Application Priority Data

Sep. 3, 2002 (JP) ........................................ 2002-258176

(51) Int. Cl.$^7$ .............................................. B60L 11/00
(52) U.S. Cl. ........................................ 701/31; 701/29
(58) Field of Search ............................. 701/29, 31, 22, 701/69, 89; 180/65.3, 65.8, 65.2, 65.4

(56) References Cited

U.S. PATENT DOCUMENTS

| | | | | |
|---|---|---|---|---|
| 4,808,902 A | * | 2/1989 | Miyazaki et al. | ........... 318/798 |
| 6,236,172 B1 | * | 5/2001 | Obara et al. | ................ 318/139 |
| 6,271,637 B1 | * | 8/2001 | Kushion | ..................... 318/434 |
| 6,329,772 B1 | * | 12/2001 | Ochiai et al. | ............... 318/139 |
| 6,330,498 B2 | * | 12/2001 | Tamagawa et al. | ........... 701/22 |
| 6,419,040 B2 | * | 7/2002 | Kitano et al. | ............... 180/243 |
| 6,434,469 B1 | | 8/2002 | Shimizu et al. | |
| 6,442,454 B1 | | 8/2002 | Akiba et al. | |
| 6,549,840 B1 | * | 4/2003 | Mikami et al. | ............... 701/69 |
| 2003/0010559 A1 | | 1/2003 | Suzuki | |
| 2003/0064858 A1 | | 4/2003 | Saeki et al. | |
| 2003/0089539 A1 | | 5/2003 | Kadota | |
| 2003/0151381 A1 | | 8/2003 | Kadota et al. | |

FOREIGN PATENT DOCUMENTS

| | | |
|---|---|---|
| JP | 10-322809 A | 12/1998 |
| JP | 2000-253512 A | 9/2000 |
| JP | 2001-138764 A | 5/2001 |
| JP | 2001-178198 A | 6/2001 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

* cited by examiner

Primary Examiner—Michael J. Zanelli
(74) Attorney, Agent, or Firm—Shinjyu Global IP Counselors, LLP

(57) ABSTRACT

An electric motor diagnosing apparatus is provided in a vehicle having a generator driven by a drive torque of a drive source, an electric motor driven by electric power supplied from the generator, and a wheel driven by the electric motor. The electric motor diagnosing apparatus comprises a counterelectromotive force determining section and an electric motor diagnosing section. The counterelectromotive force determining section determines whether a voltage of electric power supplied from the generator to the electric motor is greater than an induced voltage of a counterelectromotive force of the electric motor. The electric motor diagnosing section drives the electric motor by controlling the generator to supply the electric power to the electric motor, and determines whether the electric motor is rotating, upon determining that the voltage of the electric power supplied from the generator to the electric motor is greater than the electric motor induced voltage.

20 Claims, 17 Drawing Sheets

VEHICLE ELECTRIC MOTOR DIAGNOSING APPARATUS

BACKGROUND OF THE INVENTION

1. Field of the Invention

The present invention generally relates to a vehicle electric motor diagnosing apparatus. More particularly, the present invention relates to a vehicle electric motor diagnosing apparatus for diagnosing an electric motor that drive a subordinate wheel of a four-wheel drive vehicle.

2. Background Information

An electric motor diagnosing apparatus for a vehicle capable of four-wheel drive is Japanese Laid Open Patent Application No. 2002-218605. The electric motor diagnosing apparatus of this publication is directed to improving acceleration performance and traveling stability. The electric motor diagnosing apparatus of this publication is used in a vehicle having one pair of the front and rear wheels utilized as the main drive wheels, and the other pair of wheels utilized as the subordinate drive wheels. This electric motor diagnosing apparatus achieves its aims by driving the main drive wheels by an internal combustion engine that drives a generator, connecting the subordinate drive wheels to an electric motor via a clutch, and controlling the generation load torque of the generator so that it corresponds to the acceleration slippage when it is estimated that the main drive wheels are undergoing acceleration slippage. Thereby, the electric motor is driven with the generated electric power so as to drive the subordinate drive wheels via the clutch.

In view of the above, it will be apparent to those skilled in the art from this disclosure that there exists a need for an improved vehicle electric motor diagnosing apparatus. This invention addresses this need in the art as well as other needs, which will become apparent to those skilled in the art from this disclosure.

SUMMARY OF THE INVENTION

It has been discovered that in the above-described vehicle capable of four-wheel drive is in a state where the main drive wheels are not undergoing acceleration slip because the road surface µ is large, operation switches to a two-wheel drive mode, wherein the clutch disengages and only the main drive wheels are driven without driving the subordinate drive wheels.

Consequently, if the two-wheel drive mode is continued for a long period of time, the clutch does not engage and the electric motor is not operated during that period. As a result, failures may arise such as in the electric motor itself or in disconnections or short circuits in the harness to the electric motor due to vehicle usage conditions, environmental changes, and the like, during that period. Subsequently, even if an attempt is made to drive the subordinate drive wheels when acceleration slip is generated in the main drive wheels, the electric motor does not operate due to the failure, leading to cases in which the desired acceleration performance and traveling stability unfortunately cannot be obtained.

Accordingly, it is preferable that the electric motor diagnosing apparatus execute a self-diagnostic to detect electric motor failure. However, because a counterelectromotive force arises in the electric motor corresponding to the rotational speed thereof, the generated electric power may be inadequate because the voltage of the electric power supplied from the generator to the electric motor may be smaller than the counterelectromotive force of the motor. If a self-diagnostic of the electric motor is executed at such a time, there may be a problem in that the diagnosis cannot be made reliably because the electric motor is not rotating sufficiently, or there may be a problem in that the discovery of that failure may take time because the diagnosis requires a long time due to the length of time needed for the electric motor to reach a rotational speed at which a diagnosis can be made.

In light of these problems, an object of the present invention is to provide a vehicle drive control apparatus having excellent reliability, and that can rapidly detect a failure in the electric motor and thereby call attention to the need for repair of the electric motor.

To achieve the abovementioned objects, a vehicle electric motor diagnosing apparatus is provided for a vehicle having a generator driven by a drive torque of a drive source, an electric motor driven by electric power supplied from the generator, and a wheel driven by the electric motor. The electric motor diagnosing apparatus comprises a counterelectromotive force determining section and an electric motor diagnosing section. The counterelectromotive force determining section is configured to determine whether a voltage of electric power supplied from the generator to the electric motor is greater than an induced voltage of a counterelectromotive force of the electric motor. The electric motor diagnosing section is configured to drive the electric motor by controlling the generator to supply the electric power to the electric motor, and determine whether the electric motor is rotating, upon the counterelectromotive force determining section determining that the voltage of the electric power supplied from the generator to the electric motor is greater than the induced voltage of the counterelectromotive force of the electric motor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to FIGS. 1 to 17. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
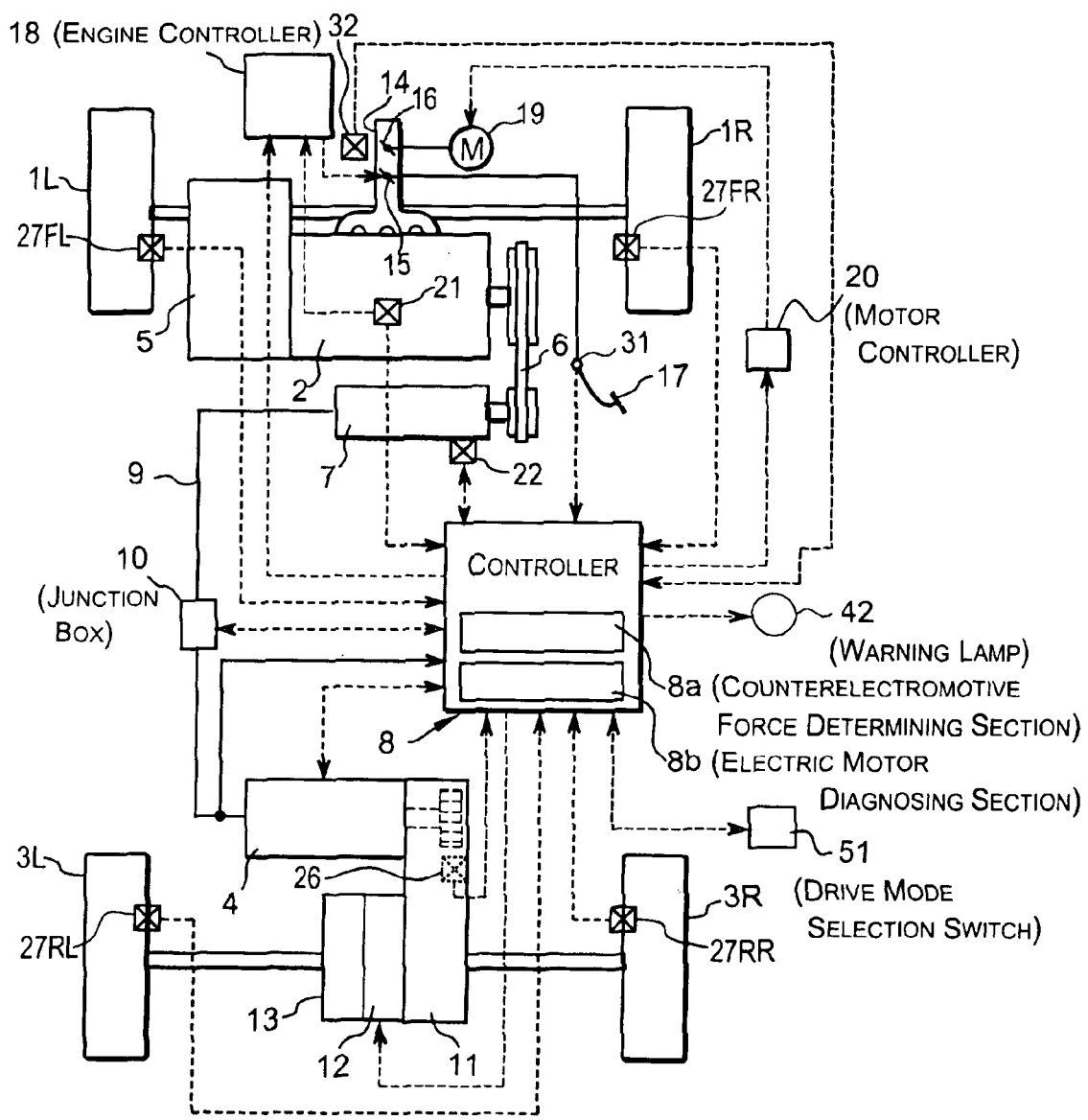
FIG. 1 is a schematic block diagram of a vehicle equipped with a vehicle electric motor diagnosing apparatus in accordance with a first embodiment of the present invention.
Figure 2:
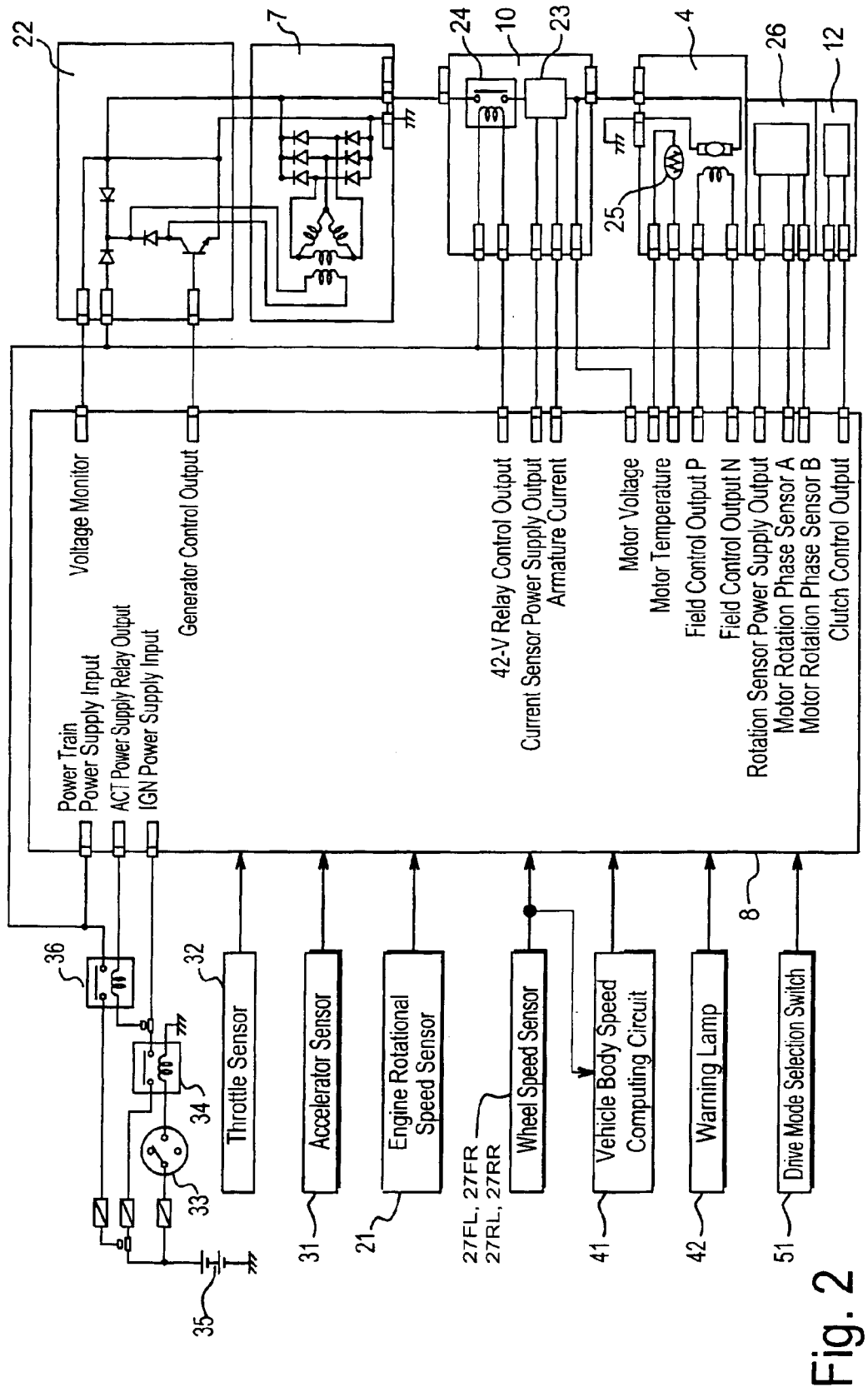
FIG. 2 is a block diagram showing a control system configuration for the vehicle electric motor diagnosing apparatusillustrated in FIG. 1 in accordance with the first embodiment of the present invention.
Figure 3:
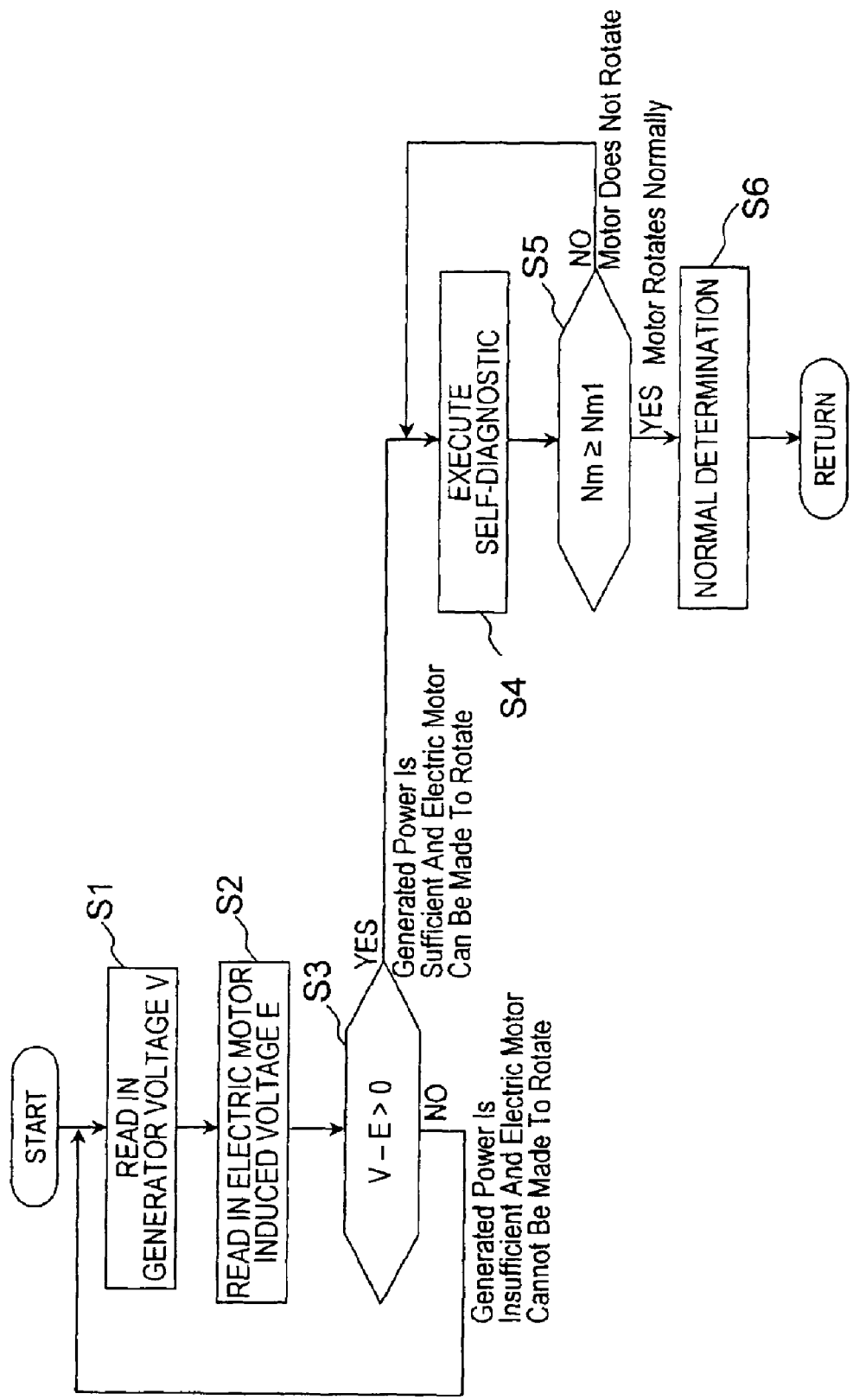
FIG. 3 is a flow chart showing the processing sequence executed by the vehicle electric motor diagnosing apparatus illustrated in FIG. 1 in accordance with the first embodiments of the present invention.
Figure 4:
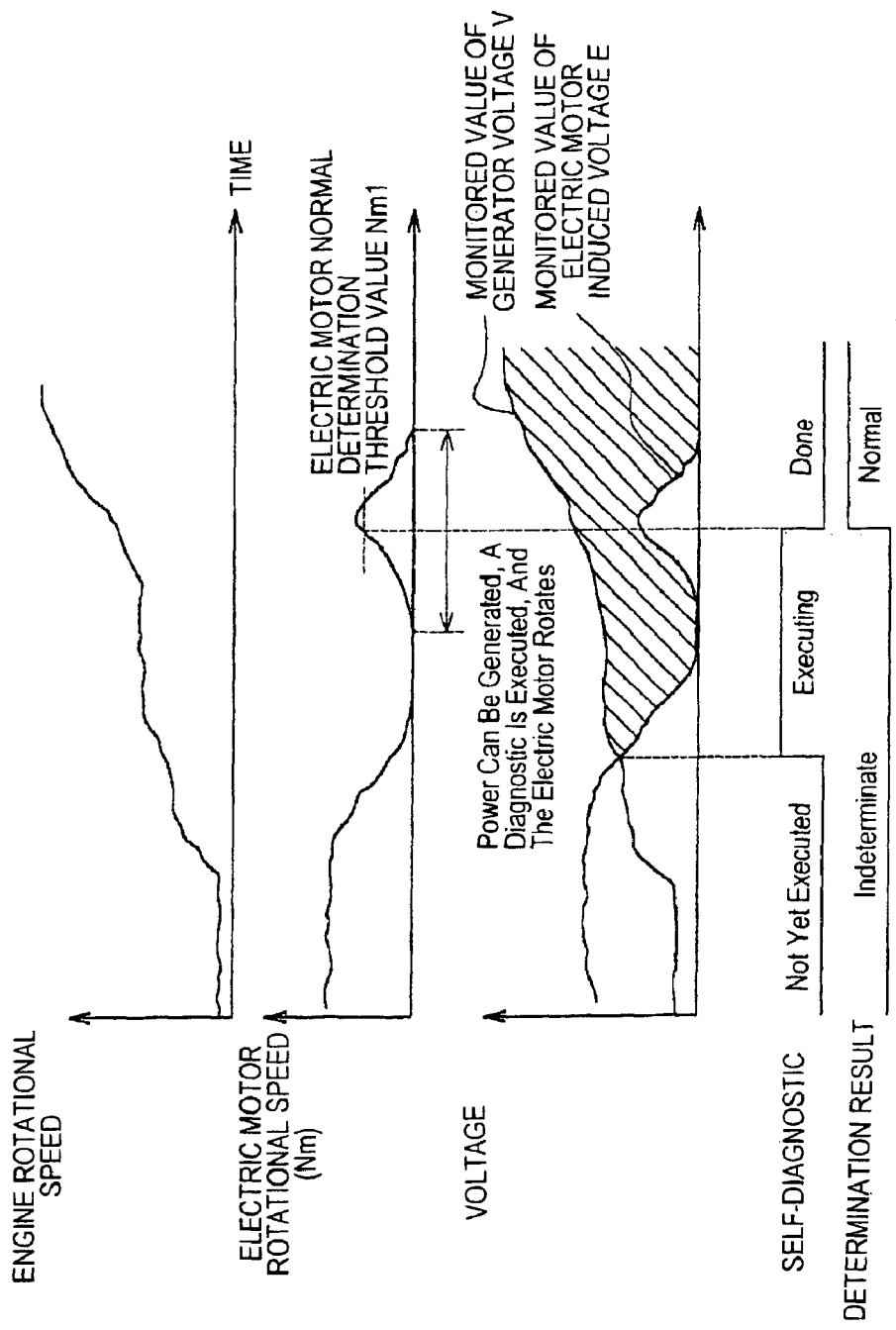
FIG. 4 is an exemplary time chart for explaining the operation of the vehicle electric motor diagnosing apparatus illustrated in FIG. 1 in accordance with the first embodiments of the present invention.

Referring initially to FIGS. 1 to 5, a vehicle drive control apparatus is illustrated in accordance with a first embodiment of the present invention. FIG. 1 is a schematic view of the main components of the vehicle drive control apparatus. FIG. 2 is control system configuration for the vehicle drive control apparatus. FIG. 3 is a flow chart for explaining the operation of the present embodiment. FIG. 4 is an exemplary time chart according to the present embodiment.

As seen in FIG. 1, a four wheel drive vehicle is diagrammatically illustrated that is equipped with the vehicle drive control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels.

A portion of the engine output torque of the internal combustion engine 2 is transmitted to the left and right front wheels 1L and 1R through an automatic transmission 5, equipped with a torque converter, and a differential gear in a conventional manner. An endless drive belt 6 transfers power from the internal combustion engine 2 to a generator 7, which supplies electrical energy to the electric motor 4. Thus, a portion of the engine output torque of the internal combustion engine 2 is transmitted to the generator 7 through the endless belt drive 6 to supply electrical energy to the electric motor 4. The generator 7 rotates at a rotational speed that is equal to the product of the rotational speed of the internal combustion engine 2 and the pulley ratio of the endless drive belt 6.

As seen in FIG. 2, a 4WD controller 8 is illustrated that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The 4WD controller 8 serving as the drive control section adjusts the field current of the generator 7 and thereby adjusts the load that the generator 7 imposes on the engine 2. The generated voltage of the generator 7 is in accordance with the imposed load torque. Thus, the load placed on the internal combustion engine 2 by the generator 7 due to the field current of the generator 7 is adjusted by the 4WD controller 8 to generate a voltage corresponding to the load torque. The generator 7 then generates an electromotive force in proportion to this load torque.

The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

The clutch 12 is preferably an electromagnetic clutch that connects and disconnects in response to a clutch control command issued from the 4WD controller 8. Of course, a hydraulic clutch that is electrically controlled can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8. When the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2.

A main throttle valve 15 and a sub throttle valve 16 are disposed inside an intake passage 14 (e.g., an intake manifold) of the engine 2. The throttle opening of the main throttle valve 15 is adjusted/controlled electronically by the 4WD controller 8 and an engine controller 18 based on the output of an accelerator sensor 31 that detects the depression amount of the accelerator pedal 17. Thus, the throttle opening of the main throttle valve 15 is adjusted and controlled in accordance with the amount of depression of the accelerator pedal 17, which also constitutes or functions as an accelerator position detecting device or sensor, or a throttle opening instructing device or sensor. The depression amount detection value from the accelerator sensor 31 is outputted as a control signal to the 4WD controller 8. The accelerator sensor 31 constitutes an accelerator position opening degree detecting sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening degree in response to drive signals from a motor controller 20. Specifically, the throttle opening degree of the sub throttle valve 16 is adjusted and controlled by the rotational angle of the stepper motor 19, which corresponds to the step count. The rotational angle of the stepper motor 19 is adjusted and controlled by a drive signal from the motor controller 20. The sub throttle valve 16 is provided with a throttle sensor 32. The step count of the stepper motor 19 is feedback-controlled based on the throttle opening detection value detected by this throttle sensor 32. This throttle sensor 32 also constitutes an accelerator position opening degree detecting sensor. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed of the internal combustion engine 2. The engine rotational speed sensor 21 outputs a control signal that is indicative of the engine rotational speed to both the engine controller 18 and the 4WD controller 8.

The generator 7 is equipped with a voltage adjuster 22 for adjusting the output voltage thereof. The voltage adjuster 22 is configured such that the generator load torque it imposes on the engine 2 and the voltage it generates are controlled by the 4WD controller 8, which accomplishes said control by adjusting the field current of the generator 7. The voltage adjuster 22 receives a generator control command (field current value) from the 4WD controller 8 and adjusts the field current of the generator 7. The voltage adjuster 22 is also capable of detecting the output voltage of the generator 7 and outputting the detected voltage value to the 4WD controller 8. Additionally, the rotational speed of the generator 7 can be computed based on the rotational speed Ne of the engine 2 and the pulley ratio of the endless drive belt 6.

A current sensor 23 and a relay 24 are connected in series inside the junction box 10. The current sensor 23 detects the current value of the electric power delivered to the electric motor 4 from the generator 7. The relay 24 connects and disconnects the supply of generated electric power from the generator 7 to the electric motor 4 in accordance with a command from the 4WD controller 8. The current sensor 23 detects the armature current supplied to the electric motor 4 from the generator 7 and outputs the detected armature current to the 4WD controller 8 as an armature control signal. The voltage value flowing through the electrical line 9 is detected by the 4WD controller 8 to produce a control signal indicative of the voltage across the electric motor 4. Furthermore, the voltage value of the electric motor 4 is continuously detected at the electrical line 9 by the controller 8, regardless of whether the relay 24 is turned on or off.

The motor 4 is also configured such that its field current, and thus its drive torque, is controlled by a command from the 4WD controller 8. A thermistor 25 measures the temperature of the motor 4 and outputs the detected temperature to the 4WD controller 8.

The motor 4 is also provided with a motor rotational speed sensor 26 configured to detect the rotational speed of the drive shaft of the motor 4 and the motor rotational speed signal detected by the motor rotational speed sensor 26 is sent to the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12. Moreover, each speed sensor 27FL, 27FR, 27RL, and 27RR also constitutes or functions as a driving force detection section that is configured to detect a vehicle traveling speed of the vehicle.

The 4WD controller 8 is connected to a battery 35 through a relay switch 34 that is energized when the ignition switch 33 is turned on. Also, the field coil of the generator 7 and the relay coil of the relay 24 are connected to the battery 35 through a relay switch 36, which is energized when the relay switch 34 is ON. An electromagnetic solenoid of the clutch 12 is also connected to the battery 35 through the relay switch 36, which is energized when the relay switch 34 is ON.

A warning lamp 42 is also connected to the 4WD controller 8. The warning lamp 42 is configured to illuminate or flash when the diagnosis finds that the motor 4 has trouble as explained below. The warning lamp 42 functions as a warning section.

A drive mode selection switch 51, which is a drive mode selecting section, is connected to the controller 8. The drive mode selection switch 51 can select any one of the modes: a four-wheel or multi-wheel drive capable mode and a two-wheel or non-all wheel drive fixed mode. The four-wheel or multi-wheel drive capable mode selectively drives the left and right rear wheels 3L and 3R by the electric motor 4 via the clutch 12 while the left and right front wheels 1L and 1R (main drive wheels) are driven by the internal combustion engine 2. The two-wheel or non-all wheel drive fixed mode drives only the left and right front wheels 1L and 1R (main drive wheels) by the internal combustion engine 2, without driving the left and right rear wheels 3L and 3R. It will be apparent to those skilled in the art that the drive mode selection switch 51, which forms apart of the drive mode selecting section, can be a manual switch or an automatically controlled switch that operates on the occurrence of selected conditions such as an estimate of an apprehension of acceleration slippage occurring.

The 4WD controller 8 basically operates in the same manner as that described in Japanese Laid-Open Patent Publication No. 2002-218605 or U.S. Pat. No. 6,434,469. When the four-wheel drive capable mode is selected by the operation of the drive mode selection switch 51, the controller 8 estimates whether the left and right front wheels 1L and 1R are undergoing acceleration slip. More specifically, based on the wheel speed detection values from the wheel speed sensors 27FL, 27FR, 27RL, and 27RR or based on the drive torque transmitted to the left and right front wheels 1L and 1R (main drive wheels) from the internal combustion engine 2 and the road surface reaction force limit torque of the left and right front wheels 1L and 1R, the 4WD controller 8 estimates if the left and right front wheels 1L and 1R are experiencing acceleration slippage. If acceleration slippage is estimated to be occurring, the 4WD controller 8 controls the field current of the generator 7 such that the generator load torque is adjusted to a torque value corresponding to the amount of acceleration slippage. At the same time, the 4WD controller 8 turns on the relay 24 and the clutch 12 and supplies the electric motor 4 with electric power from the generator 7 through the relay 24. As a result, the electric motor 4 drives the left and right rear wheels 3L and 3R (subordinate drive wheels) through the clutch 12.

Accordingly, in cases such as when the road surface $\mu$ is small or the amount that the driver has depressed the accelerator pedal 17 is large, if the torque transmitted from the internal combustion engine 2 to the left and right front wheels 1L and 1R exceeds the road surface reaction force limit torque, i.e., if the left and right front wheels 1L and 1R (main drive wheels) undergo acceleration slip, the generator 7 generates power at the generation load torque in accordance with the acceleration slippage. Therefore, the drive torque transmitted to the left and right front wheels 1L and 1R is adjusted so that it approaches the road surface reaction force limit torque of the left and right front wheels 1L and 1R. As a result, the acceleration slip of the left and right front wheels 1L and 1R (main drive wheels) is suppressed.

Furthermore, the acceleration performance and traveling stability of the vehicle are improved because the surplus electric power generated by generator 7 is used to drive the electric motor 4, which drives the left and right rear wheels 3L and 3R (which are the subordinate drive wheels). Additionally, the energy efficiency and fuel consumption can also be improved. Descriptions of other operational details and effects of the drive control apparatus are omitted here because they are described in detail in Japanese Laid-Open Patent Publication No. 2002-218605.

In the electric motor diagnosing apparatus according to the first embodiment of the present invention, in a case where the two-wheel drive fixed mode is selected by the operation of the drive mode selection switch 51 and the generator voltage V exceeds the electric motor voltage E, the controller 8 diagnoses whether the electric motor 4 is operating, by driving the electric motor 4 for a short time in a state wherein the clutch 12 is disengaged. Consequently, the controller 8 is connected to the warning lamp 42, and the warning lamp 42 is turned on or flashed on and off when a failure of the electric motor 4 is diagnosed.

FIG. 3 shows a flow chart for explaining the operation of the first embodiment. Herein, in step S1 and step S2, respectively, the controller 8 monitors the generator voltage V and the electric motor voltage (induced voltage) E, for example, every 10 ms.

In step S3, a determination is made whether the generator voltage V minus the induced voltage E is less than zero, i.e., V−E>0. If V−E>0 is true, then processing proceeds to step S4, where a self-diagnostic is executed.

In step S5, an electric motor rotational speed Nm is compared with an electric motor normal determination threshold value Nm1, which is prescribed in advance, for example, empirically. If the electric motor rotational speed Nm is greater than or equal to the electric motor normal determination threshold value Nm1, i.e., Nm≧Nm1, then processing proceeds to step S6.

In step S6, it is determined that the electric motor 4 is normal. If in step S5, the electric motor rotational speed Nm is determined to be less than the electric motor normal determination threshold value Nm1, i.e., Nm≧Nm1 is false, then processing returns to step S4.

If the motor rotational speed does not increase within a predetermined period of time and Nm≧Nm1 remains false, the electric motor 4 is determined to be abnormal. Accordingly, the controller 8 corresponds to a counterelectromotive force determining section 8a and an electric motor diagnosing section 8b.

According to the first embodiment, as shown in FIG. 4, even if a counterelectromotive force arises in the electric motor 4 corresponding to the rotational speed of the electric motor 4, in a case where the voltage of the electric power supplied from the generator 7 to the electric motor 4 is greater than the counterelectromotive force of the electric motor 4 and the generated electric power is adequate, a self-diagnostic is executed. The electric power is supplied from the generator 7 to the electric motor 4 thereby driving the electric motor 4. Thus, a determination is made as to whether the electric motor 4 is rotating. Therefore, it is possible to prevent problems such as the inability to make a reliable diagnosis because the electric motor 4 is not rotating sufficiently due to an inadequate generation of power, or taking a long time to actually discover a failure because the diagnosis requires a long time due to the length of time needed for the electric motor to reach a rotational speed at which a diagnosis can be made. Moreover, in a case where four-wheel drive is not used, such as in the summertime, it is generally difficult to notice a failure because the electric motor 4 does not operate. In light of this, according to the first embodiment, in a case where the mode is switched to the two-wheel drive fixed mode, the electric motor 4 is driven and a determination is made as to whether the electric motor 4 is rotating. Therefore, it is possible to discover and repair in advance a failure of the electric motor 4, even before four-wheel drive becomes necessary in the wintertime, and the like.

Second Embodiment

Figure 5:
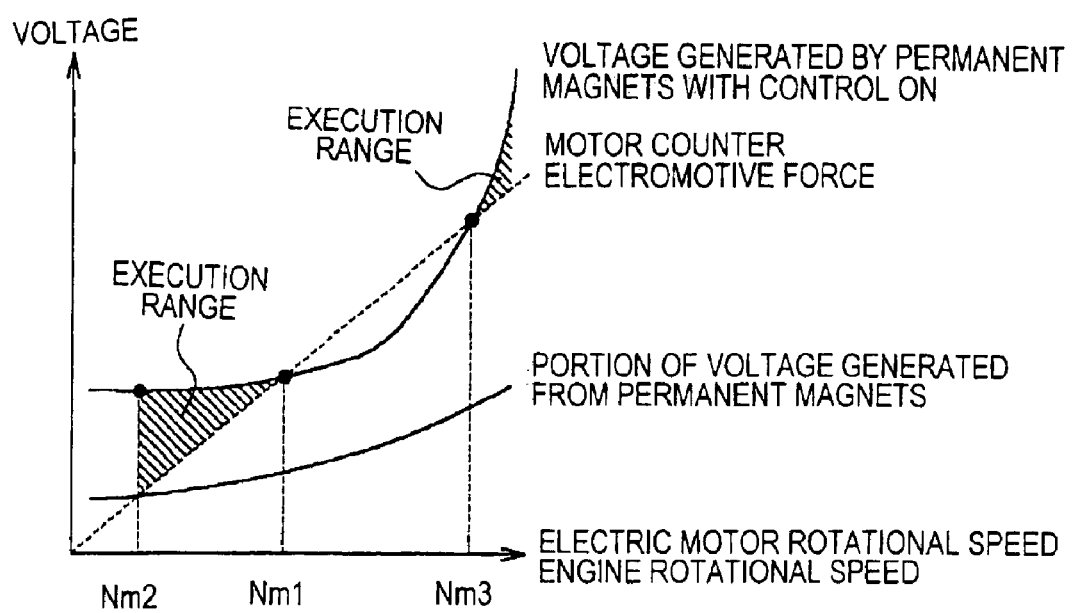
FIG. 5 shows an explanatory diagram of the relationship between the voltage generated by the generator and the electric motor counterelectromotive force in the vehicle electric motor diagnosing apparatus illustrated in FIG. 1 in accordance with the first embodiments of the present invention.
Figure 6:
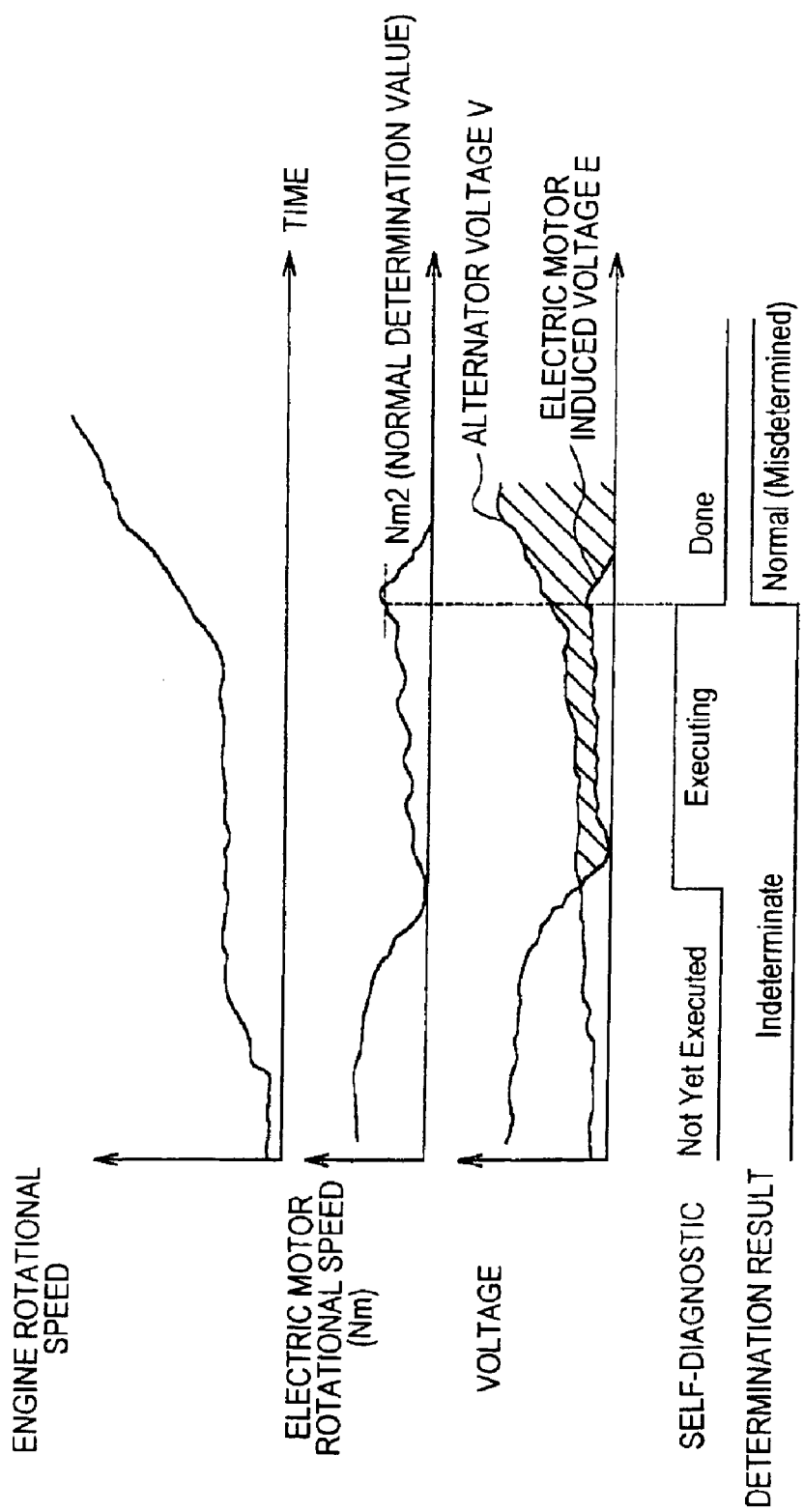
FIG. 6 is an exemplary time chart for explaining operation in the case of an abnormal field control system in the vehicle electric motor diagnosing apparatus illustrated in FIG. 1 in accordance with the first embodiments of the present invention.

Incidentally, as shown in FIG. 5, even if the generated voltage of generator 7 is a voltage generated only by the permanent magnets portion (lower solid line), there is a case in which the counterelectromotive force (broken line) increases when the rotational speed of the electric motor 4 is less than or equal to a predetermined speed (Nm2). In such a case, as shown in the time chart of FIG. 6, if the predetermined speed Nm2 is set to a normal determination threshold value, the generator voltage V (alternator) will exceed the electric motor induced voltage E, and motor rotational speed Nm≧Nm2 will become true, making it an undeniable possibility that the results will be misdetermined as normal, even if the field coil of the generator 7 cannot be controlled due to a failure. Therefore, in the second embodiment according to the present invention, as explained below, in a case where the two-wheel drive fixed mode is selected by the operation of the drive mode selection switch 51 and the generator voltage V exceeds the electric motor induced voltage E, the controller 8 continues energizing and controlling the field coil of the generator 7 in a state wherein the clutch 12 is disengaged; and the electric motor 4 is driven for a short period of time. As shown by the upper solid line in FIG. 5, the generator voltage V increases, and a diagnosis is made as to whether the electric motor 4 is operating within the range indicated by the sloped line in FIG. 5.

Figure 7:
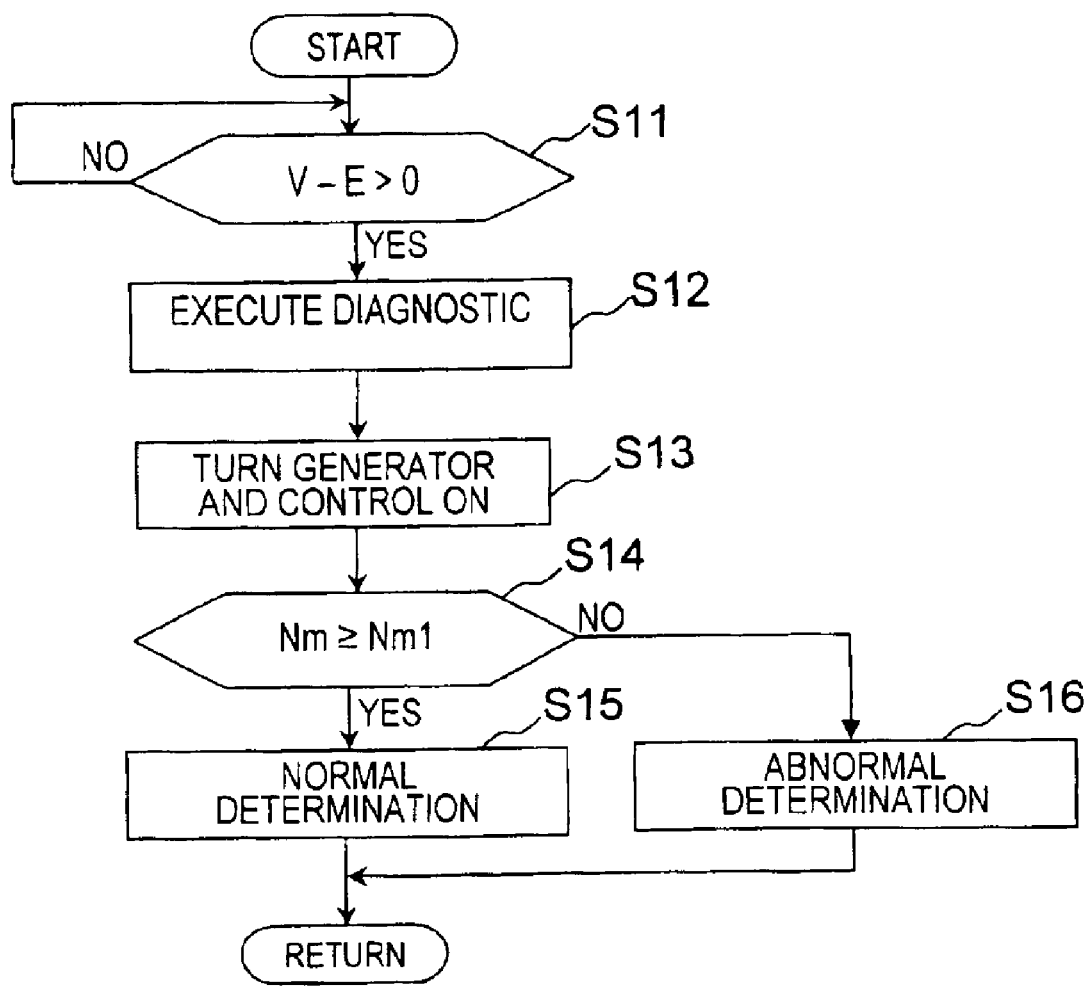
FIG. 7 is a flow chart for explaining the operation of a vehicle electric motor diagnosing apparatus according to a second embodiment of the present invention.

FIG. 7 shows a flow chart for explaining the operation of the second embodiment. Therein, in step S11, the controller 8 compares the generator voltage V with the electric motor induced voltage E, for example, every 10 seconds. If V−E>0 is true, processing proceeds to step S12, where a self-diagnostic is executed.

In step S13, the energizing and control of the field coil of the generator 7 is turned on, and the magnetic field of the field coil is added to the magnetic field of the permanent magnets.

In step S14, the electric motor rotational speed Nm is compared with the electric motor normal determination threshold value Nm1 prescribed in advance, for example, empirically, and wherein the generator voltage V has become equal to the electric motor induced voltage E in a state in which the field coil shown in FIG. 5 is energized and controlled.

If Nm≧Nm1 is true, processing proceeds to step S15, where it is determined that the electric motor 4 is normal. If Nm≧Nm1 is false, processing proceeds to step S16, where it is determined that the electric motor 4 is abnormal (failure).

Figure 8:
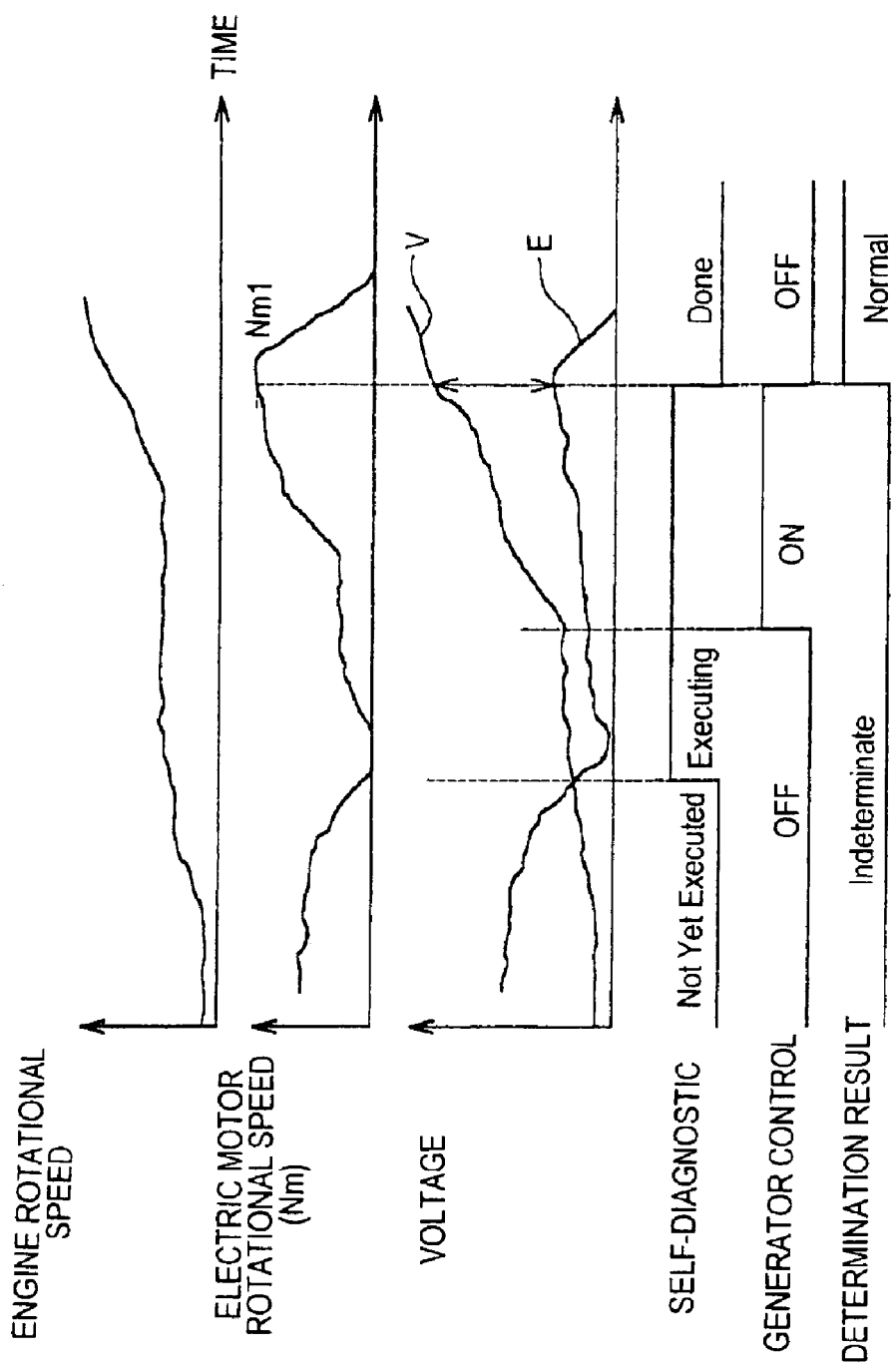
FIG. 8 is an exemplary time chart for explaining operation in the case of a normal field control system according to the vehicle electric motor diagnosing apparatus according to the second embodiment of the present invention.

According to the second embodiment, as shown in FIG. 8, even if a counterelectromotive force arises in the electric motor 4 corresponding to its rotational speed, in a case where the voltage of the power supplied from the generator 7 to the electric motor 4 is greater than the counterelectromotive force of the electric motor 4 and there is sufficient generated electric power, a self-diagnostic is executed, power is supplied from the generator 7 to the electric motor 4, thereby driving the electric motor 4, and a determination is made as to whether the electric motor 4 is rotating. Thereby, problems can be prevented, such as the inability to make a reliable diagnosis because the electric motor is not rotating sufficiently due to an inadequate generation of power, or taking a long time to actually discover a failure because the diagnosis requires a long time due to the length of time needed for the electric motor to reach a rotational speed at which a diagnosis can be made.

In addition, in a case where the mode is switched to the two-wheel drive fixed mode, the electric motor 4 is driven, a diagnosis is made as to whether the electric motor 4 is rotating. Therefore, a failure of the electric motor 4 can be discovered and repairs made in advance even before four-wheel drive becomes necessary, such as in the wintertime. Moreover, the electric motor 4 is driven so that the rotational speed of the electric motor 4, when driven by the power that is output when the generator 7 is made to generate power by the control of the field current of the field coil, is higher than when the electric motor 4 is driven by the electric power supplied when the generator 7 generates power with just permanent magnets.

Figure 9:
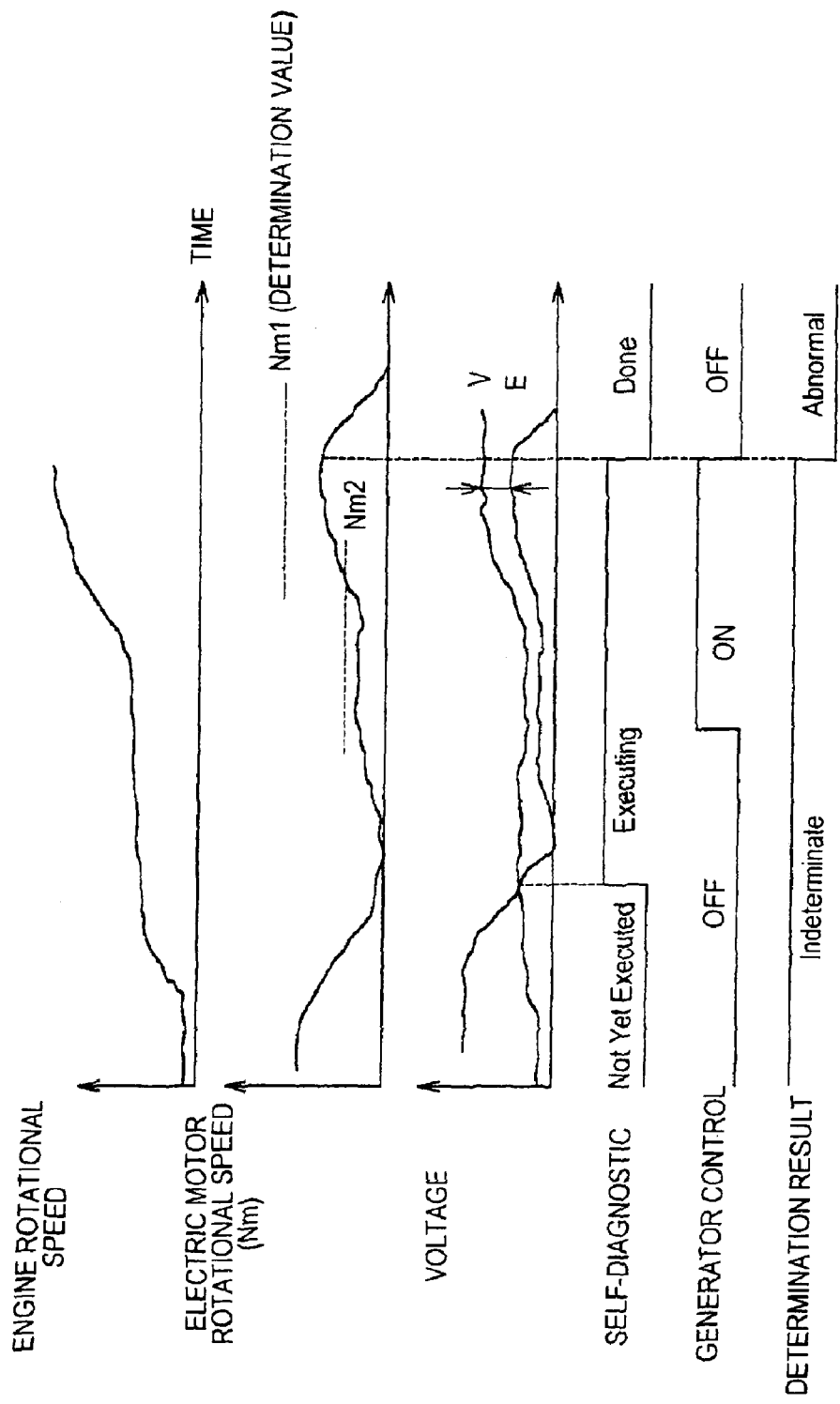
FIG. 9 is an exemplary time chart for explaining operation in the case of an abnormal field control system according to the vehicle electric motor diagnosing apparatus according to the second embodiment of the present invention.

In addition, a diagnosis is made as to whether the electric motor 4 is rotating. Therefore, as shown in FIG. 9, a failure in the field control system of the generator 7 can also be diagnosed in the case wherein the voltage V of the generator 7 does not rise greatly, even when the field current is controlled. Further, even in a case where there is a failure of the field control system and the magnetic field is only from the permanent magnets, a failure in the electric motor 4 can be diagnosed by special use of the electric motor normal determination threshold value.

Third Embodiment

Figure 10:
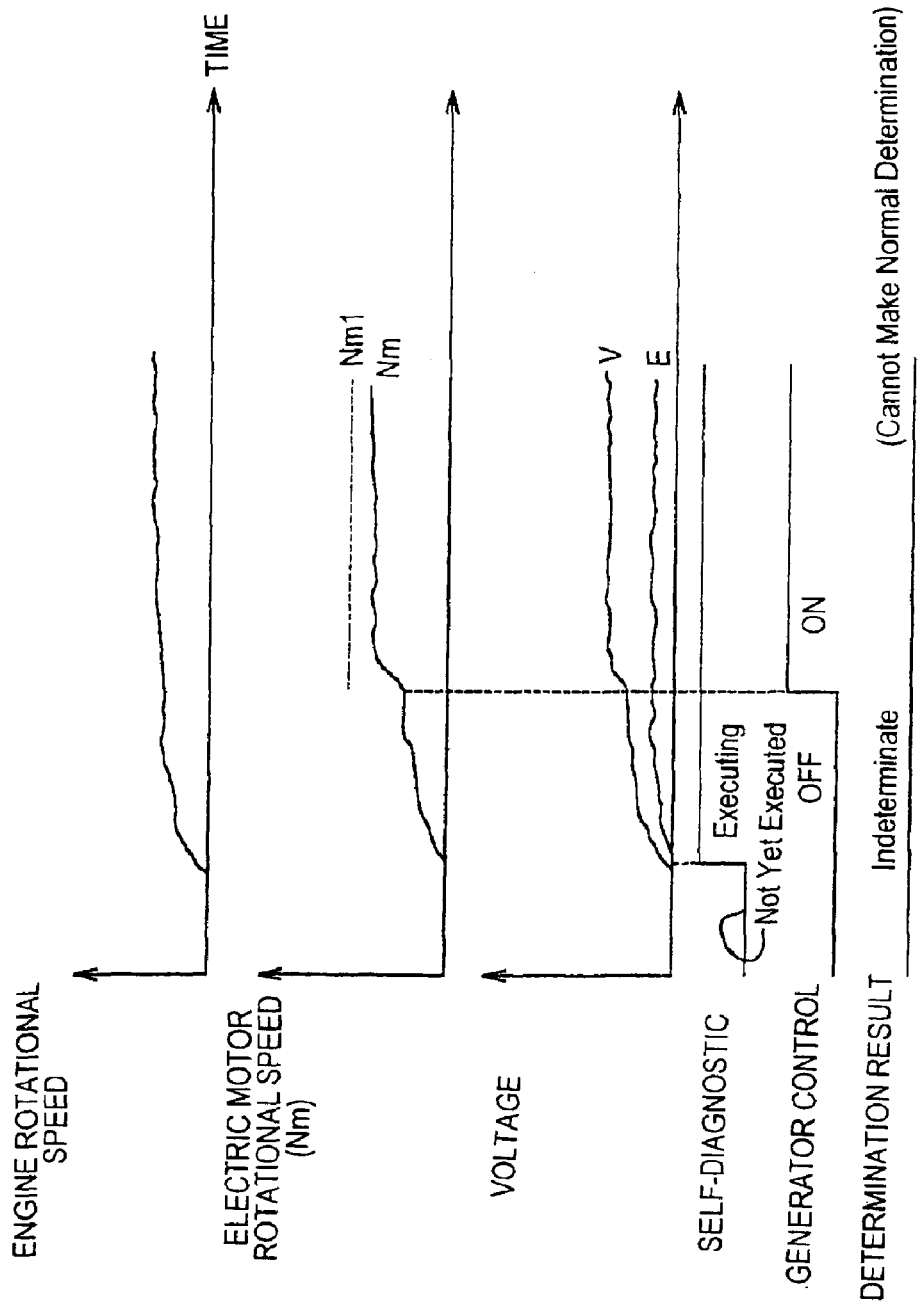
FIG. 10 is an exemplary time chart for explaining operation in the case where the engine rotational speed is too low in the vehicle electric motor diagnosing apparatus according to the second embodiment of the present invention.

In addition, as shown in FIG. 10, if the engine rotational speed is low, the rotation of electric motor 4 does not reach the electric motor normal determination threshold value Nm1 because an insufficient amount of power is generated even if the generator control is set on, and it is conceivable that a normal determination cannot be made.

In the third embodiment of the present invention as explained below, in a case wherein the two-wheel drive fixed mode is selected by the operation of the drive mode selection switch 51 and the engine rotational speed exceeds a predetermined speed, then the controller 8 diagnoses whether the electric motor 4 is operating, by continuing to energize and control the field coil of the generator 7 in a state wherein the clutch 12 is disengaged, and by driving the electric motor 4 for a short period of time.

Figure 11:
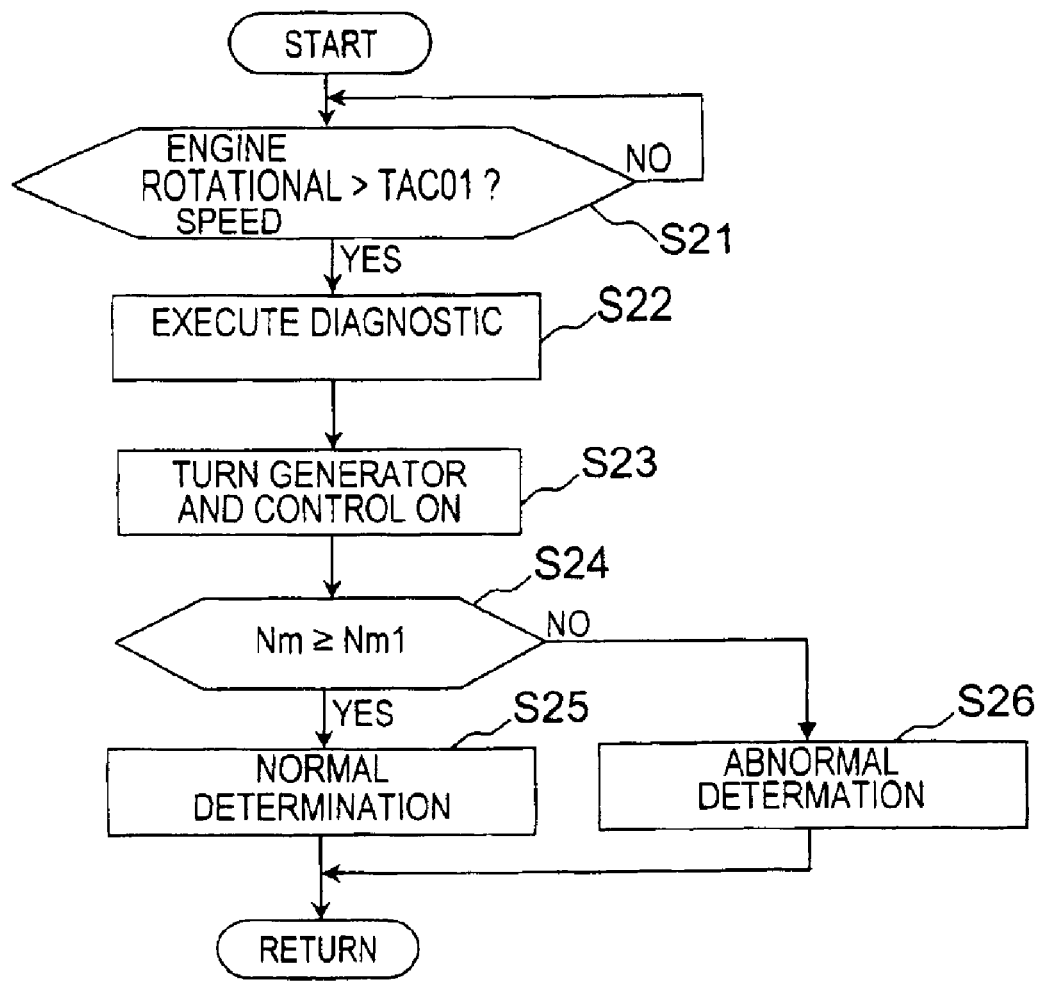
FIG. 11 is a flow chart for explaining the operation of a vehicle electric motor diagnosing apparatus according to a third embodiment of the present invention.

FIG. 11 is a flow chart for explaining the operation of the third embodiment. In step S21, the controller 8 reads in the engine rotational speed from the engine rotational speed sensor 21 (which functions as an internal combustion engine rotational speed detecting means), for example, every 10 ms. Next, it is determined whether the engine rotational speed that was read in is larger than the rotational speed TAC01 obtained from the voltage generated when the electric motor 4 is rotated up to the electric motor normal determination threshold value Nm1, which is prescribed in advance, for example, empirically. If the engine rotational speed is greater than the rotational speed TAC01, processing proceeds to step S22, where a self-diagnostic is executed.

In step S23, energizing and control of the field coil of the generator 7 is turned on, and the magnetic field of the field coil is added to the magnetic field of the permanent magnet.

In step S24, the electric motor rotational speed Nm is compared with the electric motor normal determination threshold value Nm1, which is prescribed in advance, for example, empirically, and is the value at which the generator voltage V has become equal to the electric motor induced voltage E in a state in which the field coil is energized and controlled. If Nm≧Nm1 is true, processing proceeds to step S25, where the electric motor 4 is determined to be normal. If Nm≧Nm1 is not true, processing proceeds to step S26, where the electric motor 4 is determined to be abnormal (failure).

Figure 12:
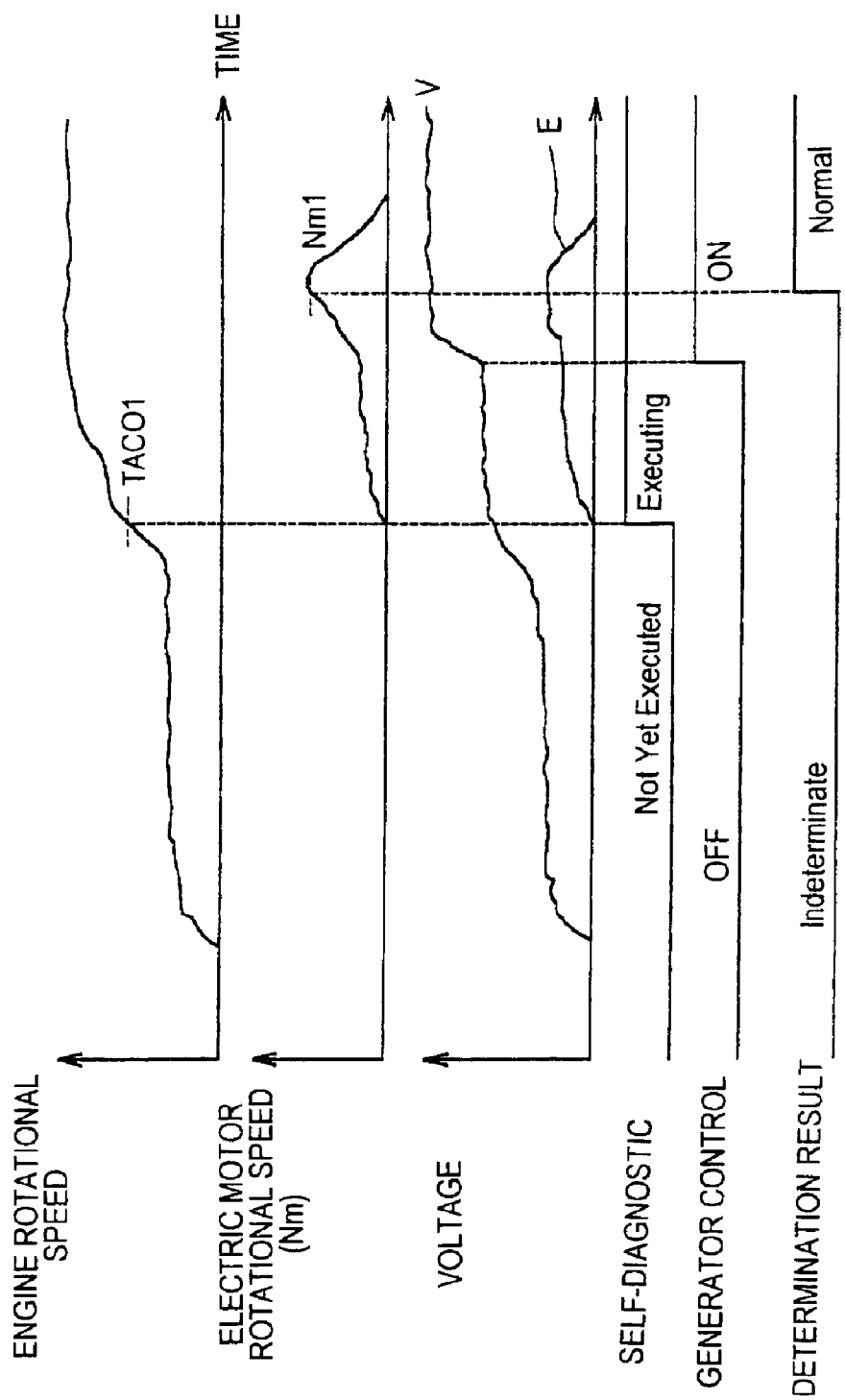
FIG. 12 is an exemplary time chart for explaining operation according to the vehicle electric motor diagnosing apparatus according to the third embodiment of the present invention.

The third embodiment obtains functions and effects similar to the previous embodiment, and adds thereto. As shown in FIG. 12, in a case where the engine rotational speed is greater than TAC01, the case is determined to be one in which the voltage of the power supplied from the generator 7 to the electric motor 4 is greater than the counterelectromotive force of the electric motor 4, and that there is sufficient generated power. Therefore, a determination in the case where there is sufficient generated power can be easily made.

Fourth Embodiment

Figure 13:
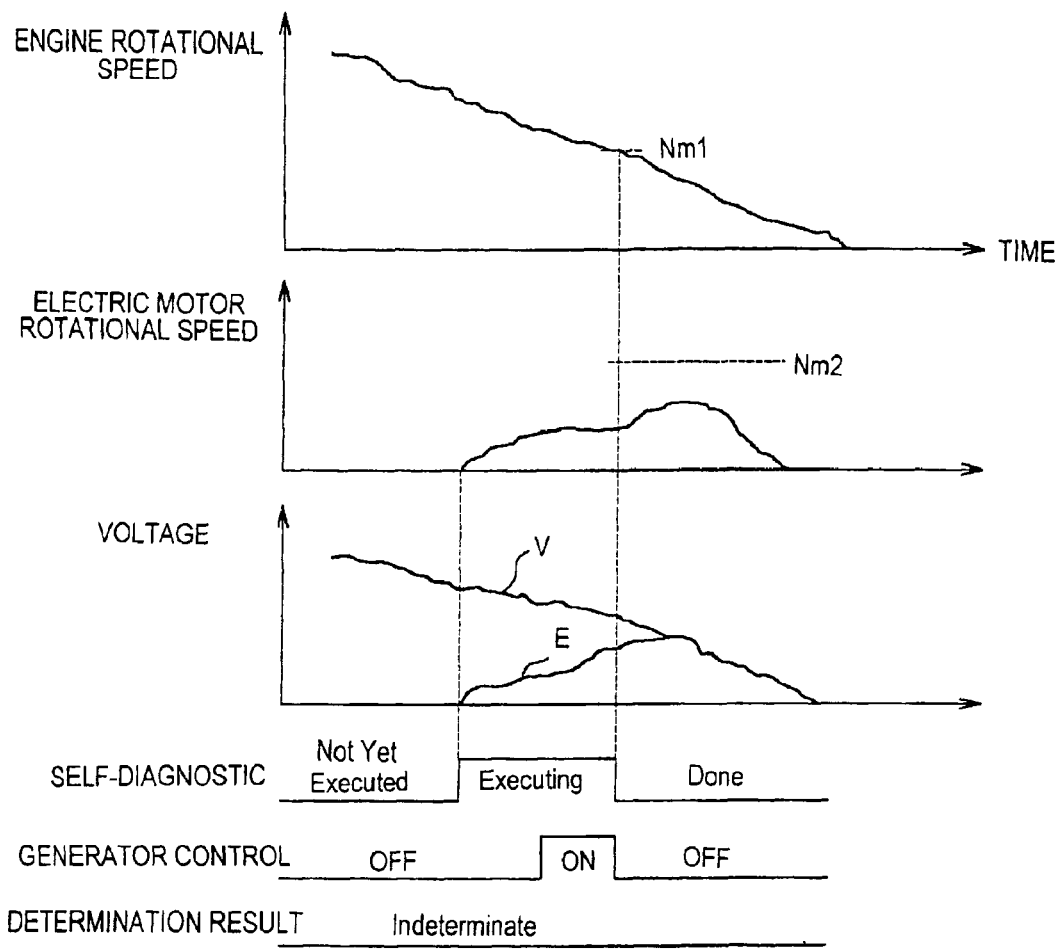
FIG. 13 is an exemplary time chart for explaining operation in the case where the accelerator position opening degree is too small in the vehicle electric motor diagnosing apparatus according to the third embodiment of the present invention.

Furthermore, as shown in FIG. 13, in a case where the accelerator pedal 17 is no longer depressed (off) and the engine rotational speed falls, a self-diagnostic is executed at the point in time when the engine rotational speed is larger than TAC01. Nonetheless, it is conceivable that the engine rotational speed unfortunately falls further due to the increased load of the generator 7, and the determination is unfortunately interrupted because the motor rotational speed does not reach the electric motor normal determination threshold value Nm2. Therefore, in the fourth embodiment according to the present invention, as explained below, in a case where the two-wheel drive fixed mode is selected by operation of the drive mode selection switch 51, the engine rotational speed exceeds a predetermined rotational speed, and the accelerator position opening degree is greater than or equal to a predetermined opening degree, then the controller 8 determines whether the electric motor 4 is operating by continuing to energize and control the field coil of the generator 7 in a state in which the clutch 12 is disengaged, and by driving the electric motor 4 for a short period of time.

Figure 14:
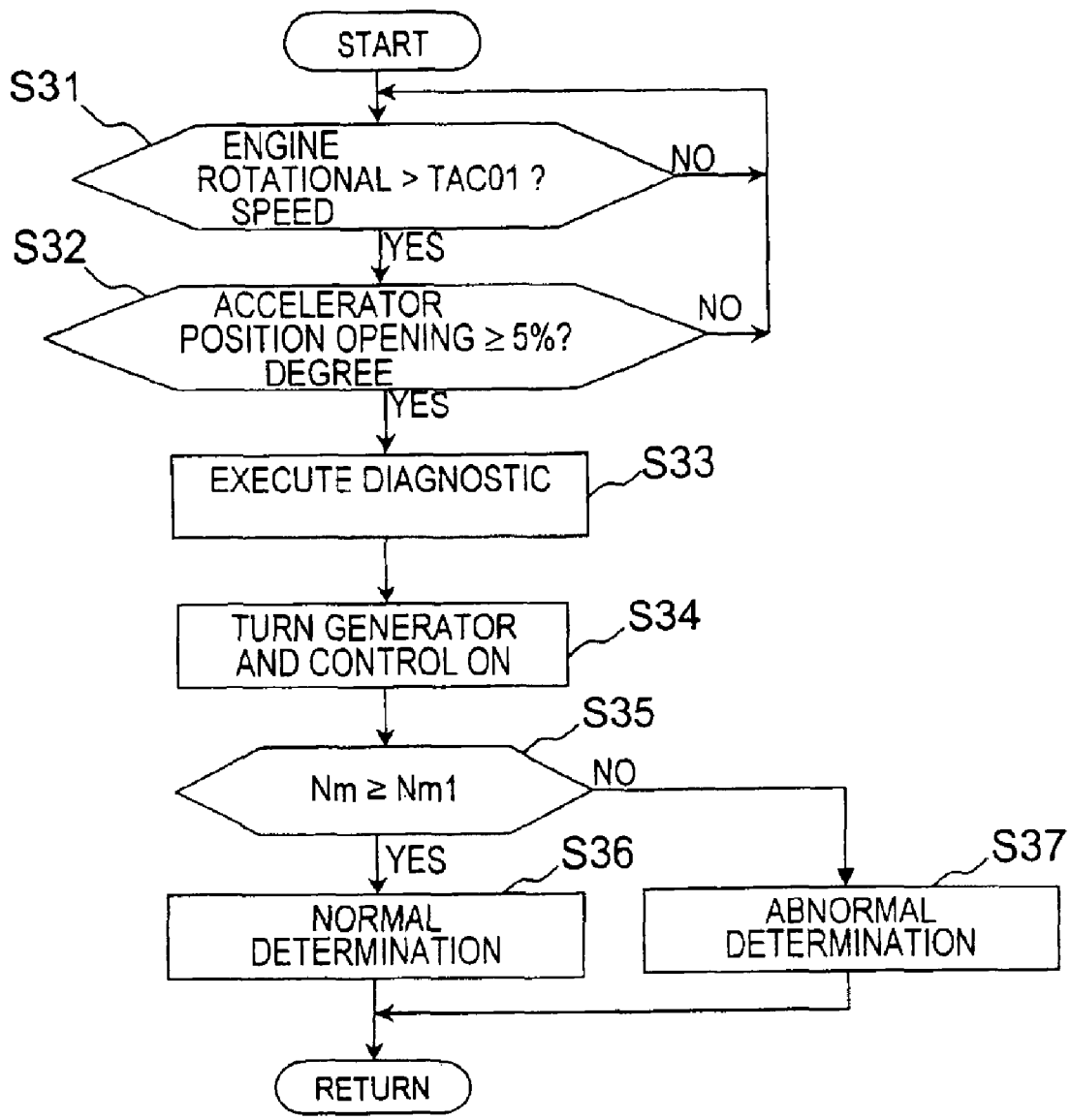
FIG. 14 is a flow chart for explaining the operation of the vehicle drive control apparatus according to a fourth embodiment of the present invention.

FIG. 14 is a flow chart for explaining the operation of the fourth embodiment. In step S31, the controller 8 reads in the engine rotational speed from the engine rotational speed sensor 21 (which functions as an internal combustion engine rotational speed detecting means), for example, every 10 ms. A determination is made whether the generated voltage obtained by rotating the electric motor 4 up to the electric motor normal determination threshold value Nm1, which is prescribed in advance, for example, empirically, is greater than the rotational speed TAC01. In a case where the engine rotational speed [that was read in] is larger than the rotational speed TAC01, processing proceeds to step S32.

In step S32, which functions as an accelerator position opening degree detecting means, the accelerator position opening degree (amount that the accelerator pedal 17 is depressed) is read in from the accelerator sensor 31. If the accelerator position opening degree is greater than or equal to, for example, five percent, processing proceeds to step S33, where a self-diagnostic is executed.

In step S34, energizing and control of the field coil of the generator 7 is turned on, and the magnetic field of the field coil is added to the magnetic field of the permanent magnets.

In step S35, the electric motor rotational speed Nm is compared with the electric motor normal determination threshold value Nm1, which is prescribed in advance, for example, empirically, and is the threshold at which the generator voltage V becomes equal to the electric motor induced voltage E in a state where the field coil has been energized and controlled. If Nm≧Nm1 is true, then processing proceeds to step S36, where the electric motor 4 is determined to be normal. If Nm≧Nm1 is false, then processing proceeds to step S37, where the electric motor 4 is determined to be abnormal (failure).

Figure 15:
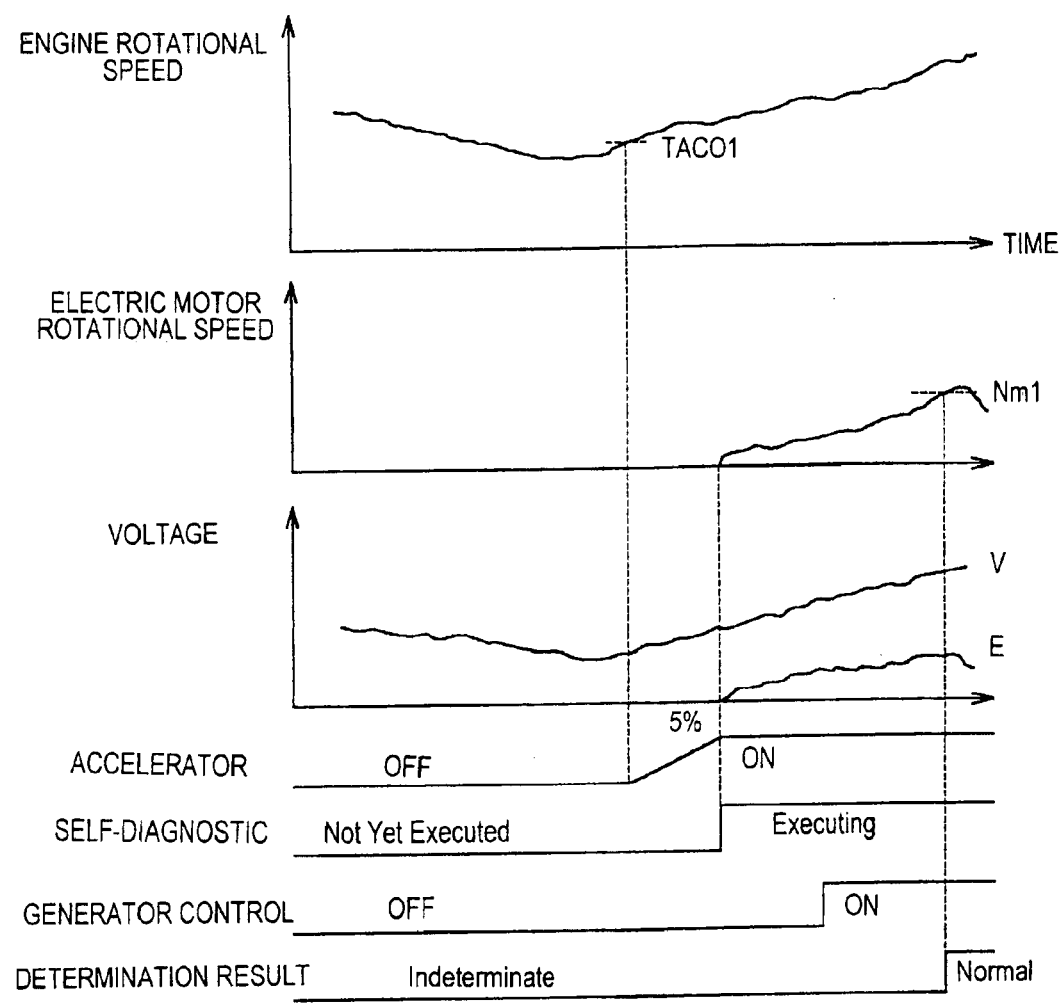
FIG. 15 is an exemplary time chart for explaining operation of a vehicle electric motor diagnosing apparatus according to the fourth embodiment of the present invention.

The fourth embodiment obtains the same functions and effects as the previous embodiment, and adds additional functions and effects. As shown in FIG. 15, in a case where the engine rotational speed is greater than the rotational speed TAC01 and the accelerator position opening degree is greater than or equal to, for example, five percent, the case is determined to be one in which the voltage of the power supplied from the generator 7 to the electric motor 4 is greater than the counterelectromotive force of the electric motor 4, and the generated power is sufficient. Therefore, problems can be prevented such as the inability to make a reliable diagnosis because the generated power is insufficient due to the insufficient output torque of the internal combustion engine 2, and requiring a long time to make a diagnosis. Thereby, a more reliable self-diagnostic can be performed. Furthermore, it is also acceptable to determine whether the accelerator position opening degree is greater than or equal to a predetermined opening degree by detecting the on/off status of a switch linked to the accelerator pedal 17.

Fifth Embodiment

Furthermore, if the electric motor suddenly operates because of the execution of a self-diagnostic during two-wheel drive travel, it is also conceivable that the passengers will feel uncomfortable due to the operating noise of the motor. In addition, if the electric motor is diagnosed every time a vehicle starts from a stop even though the electric motor does not fail very much, the electric motor will be operated frequently and wear down brushes, etc., more than is necessary. Therefore, in the fifth embodiment according to the present invention, as explained below, in a case where the two-wheel drive fixed mode is selected by operation of the drive mode selection switch 51, the vehicle speed exceeds a predetermined vehicle speed, the engine rotational speed exceeds a predetermined rotational speed, the accelerator position opening degree has become greater than or equal to a predetermined opening degree, and the generator voltage V exceeds the electric motor induced voltage E, then the controller 8 diagnoses whether the electric motor 4 is operating by continuing to energize and control the field coil of the generator 7 in a state in which the clutch 12 is disengaged, and by driving the electric motor 4 for a short period of time.

Consequently, the fifth embodiment is provided with a vehicle body speed computing circuit 41, which computes the vehicle body speed based on the wheel speed values detected by the wheel speed sensors 27FL, 27FR, 27RL and 27RR (which function as a vehicle body speed detecting means), and this computed vehicle body speed is output to the controller 8. Furthermore, it is also acceptable to incorporate the function of the vehicle body speed computing circuit 41 into the controller 8, so that the computations are performed in the controller 8. It is also acceptable to provide an independent vehicle speed sensor instead of detecting the wheel speed values from the wheel speed sensors 27FL, 27FR, 27RL and 27RR, thereby directly detecting the vehicle body speed and outputting the value of that detected vehicle body speed to the controller 8.

Figure 16:
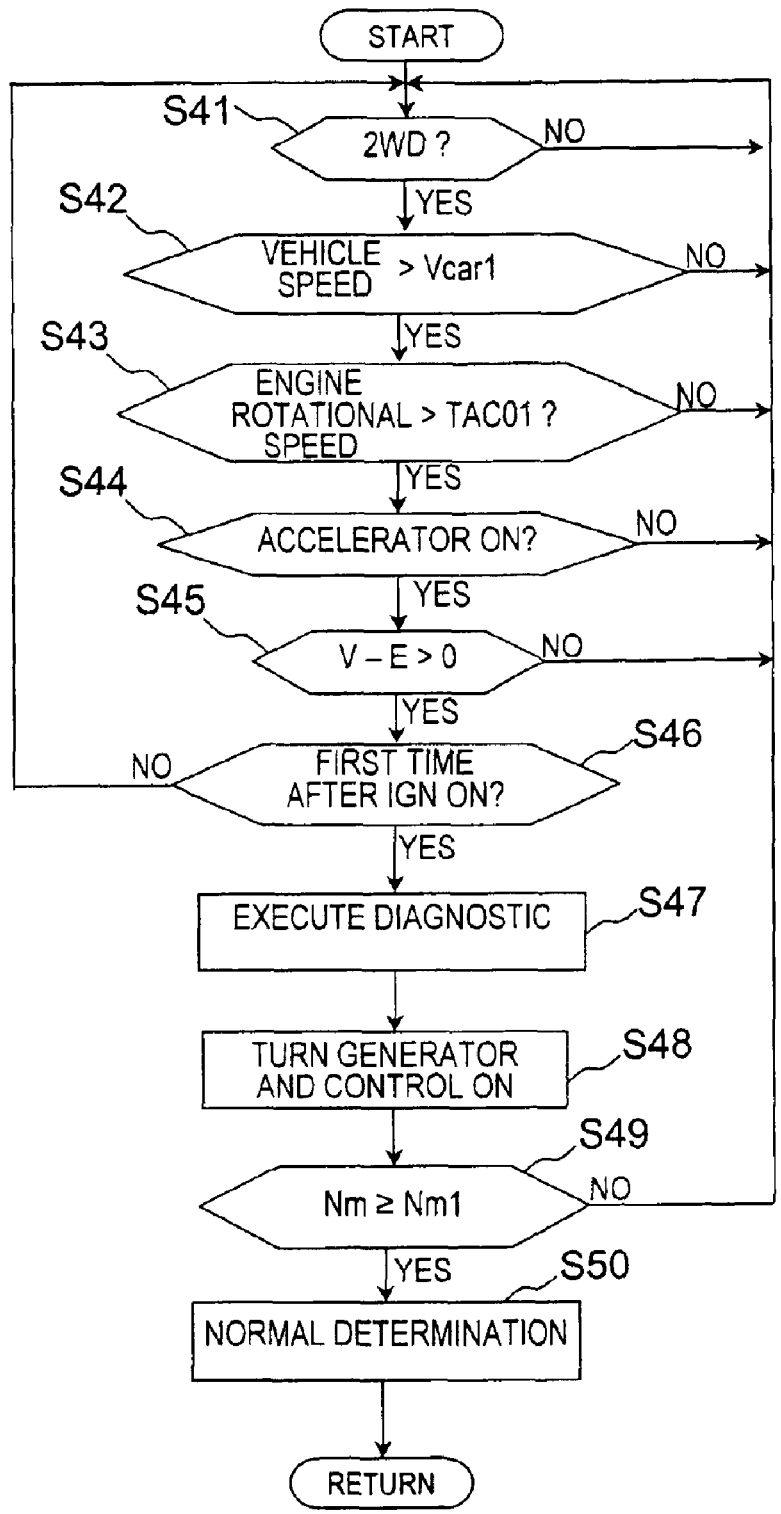
FIG. 16 is a flow chart for explaining the operation of the vehicle electric motor diagnosing apparatus according to a fifth embodiment of the present invention.

FIG. 16 is a flow chart for explaining the operation of the fifth embodiment. Therein, in step S41, the controller 8 determines, for example, every 10 ms, whether the two-wheel drive fixed mode is selected, based on a signal from the drive mode selection switch 51 (which functions as a drive mode switching means). If the two-wheel drive fixed mode is selected, processing proceeds to step S42.

In step S42, the current vehicle speed is read in from the vehicle body speed computing circuit 41, and a determination is made as to whether the current vehicle speed is greater than a predetermined vehicle speed Vcar1, which is a speed prescribed in advance, for example, empirically, and at which the operating noise of the electric motor can be masked with background noise. If the vehicle speed is greater than Vcar1, processing proceeds to step S43.

In step S43, the engine rotational speed is read in from the engine rotational speed sensor 21. A determination is made as to whether that engine rotational speed is greater than the rotational speed TAC01, which is prescribed in advance, for example, empirically, and which is that rotational speed that produces the generated voltage obtained by rotating the electric motor 4 up to the electric motor normal determination threshold value Nm1. If the engine rotational speed is greater than the rotational speed TAC01, processing proceeds to step S44.

In step S44, a determination is made as to whether the accelerator is in an on state (i.e., whether the accelerator position opening degree is greater than or equal to a predetermined opening degree) based on a signal from a switch (which functions as an accelerator position opening degree detecting means). If the accelerator is in an on state, processing proceeds to step S45.

In step S45, the generator voltage V and the electric motor induced voltage E are read in, and a determination is made as to whether V−E>0. If V−E>0 is true, processing proceeds to step S46. In step S46, a determination is made as to whether this is the first time this step has been executed since the ignition switch 33 was turned on.

In step S46, if it is determined that this is the first time this step has been executed since the ignition switch 33 was turned on, processing proceeds to step S47. In step S47, a self-diagnostic is executed.

In step S48, energizing and control of the field coil of the generator 7 are turned on, and the magnetic field of the field coil is added to the magnetic field of the permanent magnets. In step S49, the electric motor rotational speed Nm is compared with the electric motor normal determination threshold value Nm1, which is prescribed in advance, for example, empirically, and which is the threshold where the generator voltage V becomes equal to the electric motor induced voltage E in a state where the field coil is energized and controlled. If Nm≧Nm1 is true, processing proceeds to step S50.

In step S50, it is determined that the electric motor 4 is normal. However, if Nm≧Nm1 is false, it is determined that the electric motor 4 is abnormal (failure), and processing returns to step S41. In addition, if the determination in any one of the steps S41 to S46 is false, processing returns to step S41.

Figure 17:
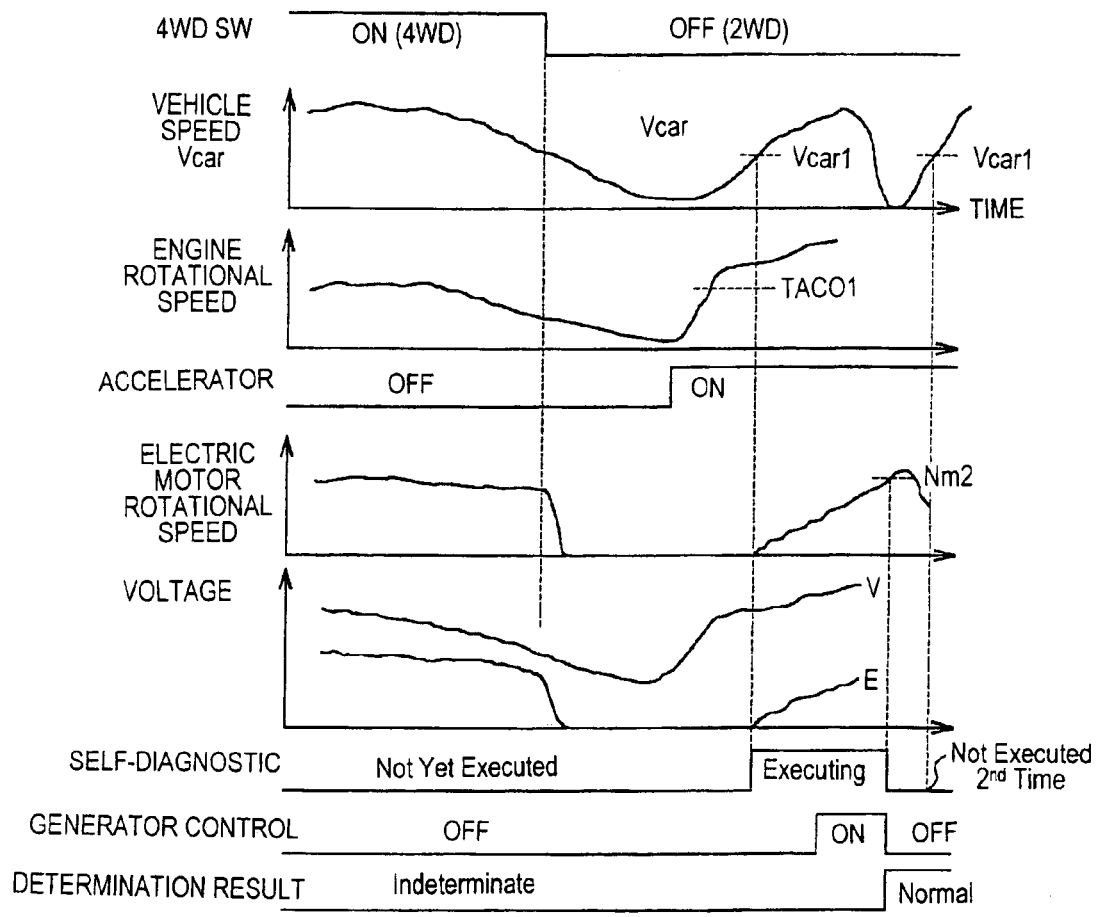
FIG. 17 is an exemplary time chart for explaining operation of the vehicle electric motor diagnosing apparatus according to the fifth embodiment.

The fifth embodiment obtains the same functions and effects as the previous embodiment, and adds to those functions and effects. As shown in FIG. 17, a self-diagnostic is executed if the vehicle speed Vcar is greater than a predetermined vehicle speed Vcar1, which is a speed at which the electric motor operating noise can be masked by background noise. Therefore, it is possible to prevent a feeling of discomfort in the passengers due to the operating noise of the motor caused by a self-diagnostic executed during two-wheel drive travel. In addition, only one self-diagnostic is executed every time the ignition switch 33 is turned on. Therefore, it is possible to prevent unnecessary wearing down of the brushes, and the like, due to the frequent operation of the electric motor 4.

Furthermore, the present invention is not limited only to the above-described embodiments, and numerous other variations and modifications are possible. For example, in each of the above embodiments, the left and right front wheels 1L and 1R were the main drive wheels and the left and right rear wheels 3L and 3R were the subordinate drive wheels. However, it is possible to make the left and right front wheels 1L and 1R the subordinate drive wheels, selectively driving them by the electric motor 4 via the clutch 12, and to make the left and right rear wheels 3L and 3R the main drive wheels, driving them by the internal combustion engine 2. In addition, the present invention is not limited to a vehicle having a four-wheel drive capable mode, and can be broadly applied to vehicles wherein the wheels are selectively driven by a motor via a clutch. Furthermore, in each of the above embodiments, a self-diagnostic was executed only in the two-wheel drive fixed mode, but it is also possible to execute a self-diagnostic during two-wheel drive travel in the four-wheel drive capable mode. In addition, in each of the above embodiments, the warning lamp 42 was lit or flashed on and off when the electric motor 4 diagnosis result was abnormal (failure). However, it is also possible to generate a warning sound at the same time, or to use a warning sound instead of the warning lamp 42.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-258176. The entire disclosure of Japanese Patent Application No. 2002-258176 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle electric motor diagnosing apparatus for a vehicle having a generator driven by a drive torque of a drive source, an electric motor driven by electric power supplied from the generator, and a wheel driven by the electric motor, the electric motor diagnosing apparatus comprising:

a counterelectromotive force determining section configured to determine whether a voltage of electric power supplied from the generator to the electric motor is greater than an induced voltage of a counterelectromotive force of the electric motor; and an electric motor diagnosing section configured to drive the electric motor by controlling the generator to supply the electric power to the electric motor, and determine whether the electric motor is rotating, upon the counterelectromotive force determining section determining that the voltage of the electric power supplied from the generator to the electric motor is greater than the induced voltage of the counterelectromotive force of the electric motor.

2. The vehicle electric motor diagnosing apparatus according to claim 1 wherein the electric motor diagnosing section is further configured to drive the electric motor by controlling a field current of a field coil of the generator to supply the electric power to the electric motor such that the electric motor is to be rotated at a rotational speed that is higher than a rotational speed of the electric motor when the generator generates electric power using only at least one permanent magnet of the generator.

3. The vehicle electric motor diagnosing apparatus according to claim 2, wherein the counterelectromotive force determining section is further configured to determine that the voltage of the electric power supplied from the generator to the electric motor is greater than the counterelectromotive force of the electric motor by determining the drive torque of the drive source is larger than a prescribed value.

4. The vehicle electric motor diagnosing apparatus according to claim 1, wherein the counterelectromotive force determining section is further configured to determine that the voltage of the electric power supplied from the generator to the electric motor is greater than the counterelectromotive force of the electric motor by determining the drive torque of the drive source is larger than a prescribed value.

5. The vehicle electric motor diagnosing apparatus according to claim 4, wherein the counterelectromotive force determining section is further configured to determine that the drive torque of the drive source is larger than the prescribed value by determining that a detected rotational speed of the drive source is at least equal to a predetermined rotational speed.

6. The vehicle electric motor diagnosing apparatus according to claim 4, wherein the counterelectromotive force determining section is further configured to determine that the drive torque of the drive source is larger than the prescribed value by determining that a detected accelerator position opening degree of the vehicle is at least equal to a predetermined accelerator position opening degree.

7. The vehicle electric motor diagnosing apparatus according to claim 6, further comprising an accelerator position opening degree detecting sensor configured and arranged to detect at least one of an accelerator position and a throttle opening degree.

8. The vehicle electric motor diagnosing apparatus according to claim 1, wherein the electric motor diagnosing section is further configured to drive the electric motor and determine that the electric motor is rotating, only upon determining a vehicle speed of the vehicle is at least equal to a predetermined vehicle speed.

9. The vehicle electric motor diagnosing apparatus according to claim 1, wherein the electric motor diagnosing section is further configured to drive the electric motor and determine whether the electric motor is rotating, upon determining a state in which the wheel is not driven by the electric motor.

10. The electric motor diagnosing apparatus according to claim 1, wherein the electric motor diagnosing section is further configured to drive the electric motor and determine whether the electric motor is rotating, upon determining a non-all wheel drive mode has been designated.

11. The vehicle electric motor diagnosing apparatus according to claim 1, wherein the electric motor diagnosing section is further configured to drive the electric motor and determine whether the electric motor is rotating, only once every time a system switch of the drive source has been determined to be turned on.

12. The vehicle electric motor diagnosing apparatus according to claim 11, wherein the system switch is an ignition switch of the drive source.

13. The vehicle electric motor diagnosing apparatus according to claim 1, further comprising a mode selecting section configured to select either of a multi-wheel mode in which the wheel is driven by the electric motor and another wheel is driven by the drive source, and a non-all wheel mode in which a clutch disposed between the wheel and the electric motor is disengaged; and the electric motor diagnosing section is further configured to diagnose when the non-all wheel drive mode is selected by the mode selecting section.

14. The vehicle electric motor diagnosing apparatus according to claim 1, further comprising a main drive source arranged to drive at least one drive wheel that is not connected to the electric motor.

15. The vehicle electric motor diagnosing apparatus according to claim 14, wherein the main drive source is an internal combustion engine that drives a generator that supplies electricity to the electric motor.

16. The vehicle electric motor diagnosing apparatus according to claim 15, wherein the electric motor diagnosing section is further configured to drive the electric motor by controlling a field current of a field coil of the generator to supply the electric power to the electric motor such that the electric motor is to be rotated at a rotational speed that is higher than a rotational speed of the electric motor when the generator generates electric power using only at least one permanent magnet of the generator.

17. The vehicle electric motor diagnosing apparatus according to claim 15, wherein the counterelectromotive force determining section is further configured to determine that the voltage of the electric power supplied from the generator to the electric motor is greater than the counterelectromotive force of the electric motor by determining the drive torque of the drive source is larger than a prescribed value.

18. The vehicle electric motor diagnosing apparatus according to claim 17, wherein the counterelectromotive force determining section is further configured to determine that the drive torque of the drive source is larger than the prescribed value by determining that at least one of a detected rotational speed of the drive source is at least equal to a predetermined rotational speed and a detected accelerator position opening degree of the vehicle is at least equal to a predetermined accelerator position opening degree.

19. A vehicle electric motor diagnosing apparatus for a vehicle having a generator driven by a drive torque of a drive source, an electric motor driven by electric power supplied from the generator, and a wheel driven by the electric motor, the electric motor diagnosing apparatus comprising:

counterelectromotive force determining means for determining whether a voltage of electric power supplied from the generator to the electric motor is greater than an induced voltage of a counterelectromotive force of the electric motor; and electric motor diagnosing means for driving the electric motor by controlling the generator to supply the electric power to the electric motor, and determining whether the electric motor is rotating, upon the counterelectromotive force determining means determining that the voltage of the electric power supplied from the generator to the electric motor is greater than the induced voltage of the counterelectromotive force of the electric motor.

20. A vehicle electric motor diagnosing method for a vehicle having a generator driven by a drive torque of a drive source, an electric motor driven by electric power supplied from the generator, and a wheel driven by the electric motor, the electric motor diagnosing apparatus comprising:

determining whether a voltage of electric power supplied from the generator to the electric motor is greater than an induced voltage of a counterelectromotive force of the electric motor;

driving the electric motor by controlling the generator to supply the electric power to the electric motor; and determining whether the electric motor is rotating, upon determining that the voltage of the electric power supplied from the generator to the electric motor is greater than the induced voltage of the counterelectromotive force of the electric motor.

* * * * *